United States Patent [19]

Kansupada et al.

[11] Patent Number: 5,175,203

[45] Date of Patent: Dec. 29, 1992

[54] RUBBER SURFACE IDENTIFICATION COATING AND RUBBER PRODUCTS DERIVED THEREFROM

[75] Inventors: Bharat K. Kansupada, Mogadore; Larry L. Mershon, Hartville; Christopher J. Koscho, Stow, all of Ohio

[73] Assignee: The Goodyear Tire & Rubber Company, Akron, Ohio

[21] Appl. No.: 746,839

[22] Filed: Aug. 19, 1991

[51] Int. Cl.⁵ .............................................. C08K 5/09
[52] U.S. Cl. .................................. 524/399; 524/430; 524/474
[58] Field of Search ..................... 524/399, 474, 430

[56] References Cited

U.S. PATENT DOCUMENTS

| | | | |
|---|---|---|---|
| 2,018,557 | 10/1935 | Hopkins | 524/474 |
| 2,436,791 | 3/1948 | Cray | 524/474 |
| 3,106,443 | 10/1963 | Cuthbertson et al. | 524/399 |
| 3,580,875 | 3/1971 | Behnke | 524/474 |

FOREIGN PATENT DOCUMENTS 200358  12/1955  Australia .

Primary Examiner—Paul R. Michl
Assistant Examiner—Tae H. Yoon
Attorney, Agent, or Firm—Henry C. Young, Jr.

[57] ABSTRACT

The marking of an uncured or partially cured rubber surface with a marking, or identifying coating, which basically, disappears upon curing the rubber. In one aspect, the coating is applied as a suspension or solution in a specified solvent mixture. An article can be produced thereby as a cured assembly of rubber components.

7 Claims, No Drawings

RUBBER SURFACE IDENTIFICATION COATING AND RUBBER PRODUCTS DERIVED THEREFROM

FIELD

This invention relates to coating an uncured rubber surface. The invention further relates to a method of fabricating rubber products with at least one component of an uncured rubber surface having an identifying coating thereon and to products composed of such an assembly of rubber components. The invention additionally relates to marking an uncured carbon black-containing rubber composition with a contrastingly visible metallic salt of a fatty acid, e.g. zinc stearate-based coating composition thereon which tends to loose its contrasting visibility upon curing the rubber composition at an elevated temperature.

Rubber products are often prepared by assembling a multiplicity of uncured rubber components together to form a manufactured article. Sometimes a combination of uncured and cured rubber components is also used. The resulting rubber assembly is cured under conditions of elevated temperature and pressure.

Sometimes, the rubber components are pre-extruded or are otherwise preformed before they are built into a manufactured article.

Often, it is desired to mark various of the preformed, unassembled rubber components in their uncured state for identification purposes. Such marking may be used for various individual tire components such as its rubber components of tread, sidewall and carcass.

Indeed, in some instances, it is desired that the uncured rubber components are individually labeled, or identified by a marking composition, or ink, so that they can be individually stored and later identified and utilized in the assembly and fabrication process.

However, for appearance or other purposes, it is sometimes desired for the identifying marking to be removed after the marked rubber is cured.

For example, in practice, for the manufacture of rubber tires, a tread rubber might first be formed as an extruded strip of carbon black containing uncured rubber with identifying marking(s) being applied to the rubbers. Then, the marked rubber tread strip is built into the tire and the resulting tire assembly cured at an elevated temperature. The finished cured tire tread will still conventionally have the identifying marking on its exposed surface.

For various purposes, which may include cosmetic, esthetic or other purposes, it may be desired to remove the marking from the cured tire tread. This might be accomplished, for example, by grinding away the tread rubber surface or by washing the tread surface with a suitable volatile organic solvent. It will still be difficult to remove the marking from the recessed grooves of the tire tread. Both of the described removal processes may be considered to be wasteful of resources and relatively inefficient.

Therefore, it is desired that an identifying coating composition be applied to an uncured rubber which, upon curing the rubber, tends to loose its visibility. Although not necessarily limited thereto but as a preferred aspect, it is desired the uncured rubber contains carbon black, as well as the curative, and is, therefore, black in color. In such instance, it is desired that the coating composition has a color that visibly contrasts with black.

For the coating itself, it is desired that its composition has a color that contrasts with the rubber, particularly carbon black-containing rubber, is film forming in that it is continuous with a minimal, if any, cracking of its surface for a reasonable period of time after its application, is compatible with conventional rubber compositions, will melt and tend to disperse, absorb or imbibe into the rubber composition at temperatures in a range of about 100° C. to about 150° C., preferably at a minimum of about 125° C. and is desirably applied in a solvent with a suitable drying time at conventional ambient temperatures of about 20° C. to about 30° C.

Zinc stearate can be applied to a black colored rubber surface and used as a distinguishing white coating. However, it rapidly absorbs into the rubber and loses its color visibility in too short a time to be of practical use.

In one aspect of the invention, it is desired that the coating composition be applied to the rubber substrate as a dispersion or solution in a prescribed organic solvent.

While various aromatic solvents might be contemplated for such use, it is desired to provide an essentially aliphatic solvent for such surface treatment which contains less than about one weight percent aromatic components and has an adequate drying time.

Accordingly, it is desired to provide a solvent for such purposes which contains less than one weight percent and, thus is basically free, of aromatic materials such as, for example, benzene, alkyl substituted benzenes, xylene and alkyl substituted xylenes as designated aromatic and substituted aromatic hydrocarbons. It is also desired that it contains less than about one weight percent n-hexane or cyclohexane.

The solvent, or solvent blend, should have a drying rate that is slow enough to allow the coating to cover an appropriate area on the rubber surface yet should dry fast enough so that it can be suitably be used in a manufacturing operation. For convenience, and for the purposes of this description, a boiling point range is used for such parameter without designating specific heat conductivities or actual drying rates of the solvent.

Preferably, such aliphatic solvent, or solvent blend, would have a boiling point, at standard temperature and pressure (STP), in a range of about 95° C. to about 102° C.

Further, it is desired that the solvent has a reasonable ability to dissolve a resin binder for the coating composition.

By experience, it is considered herein that a hydrocarbon solvent or solvent mixture having a KB value in a range of about 28 to about 38, preferably about 32 to about 36, is generally satisfactory for the solvency purposes of this invention.

The KB (Kauri-Butanol) values are conventionally determined by first dissolving 100 grams of Kauri Gum in 500 grams of butanol (thus, the designation KB). The desired solvent, or solvent mixture, is titrated into the KB solution to determine its KB value. KB values have been published in the literature for various aromatic and aliphatic hydrocarbon solvents. The KB value is, generally, an indication of the solubility of the Kauri Gum resin (contained in the butanol solution) in the solvent being tested. For example, a KB value for toluene or benzene would be about 105-110; cyclohexane about 100; and heptane would be about 29.

A reference to the KB test may be found in "Physical And Chemical Examination of Paints, Varnishes, Lacquers And Colors", Eleventh Edition, 1950, pages 449-451, by Gardner and Sward, originally distributed by The Henry Gardner Laboratory, Inc., Bethesda, Maryland.

Heptane, by itself, an aliphatic $C_7$ hydrocarbon with a KB value of about 29, is considered to be inappropriate, primarily because its observed drying time was found to be unacceptable because it was considered to be too slow.

However, n-heptane was considered to be a good solvent if it could be successfully blended with other hydrocarbons because of its drying time was considered to be nearly adequate and, also, because of its favorable KB value.

Accordingly, it was decided to proceed to utilize hydrocarbon solvent blends which had a heptane base for such purpose.

As another part of the invention, it is desired to provide a resin for the coating composition that has a melting point below about 135° C. and preferably between about 80° C. and about 120° C. according to ASTM Test No. E28. It is also desired that the resin is compatible with conventional uncured rubber compositions.

It is further desired that the coating contains a filler material, such as white zinc stearate, of a color which contrasts with the rubber, particularly black colored rubber and has a melting point below about 135° C.

Thus, it is envisioned that the marking composition would, basically, be composed of the aforesaid filler and a resin binder for the filler. Additional materials may be added to the composition such as, for example, flattening agent(s).

In the description of this invention, for the treatment purposes, uncured rubber means uncured and partially cured compounded rubber. Compounded rubber is used in a conventional sense, namely, for rubber which has been mixed with compounding ingredients, including curatives, or curing agents.

DISCLOSURE AND PRACTICE OF THE INVENTION

In accordance with this invention, a composition is provided which is comprised of (A) 100 parts by weight of at least one fine particle sized metallic salt of a fatty acid having a melting point of less than 135° C., preferably a zinc salt, and more preferably zinc stearate and, (B) as a binder therefor, about 10 to about 15 parts by weight of a resin characterized by having a melting point in a range of about 80° C. to about 120° C., preferably about 90° C. to about 110° C., and soluble in an organic solvent having a KE in a range of about 28 to about 38, preferably about 32 to about 36.

Preferably, the coating composition may also contain, as a flattening agent, about 0.05 to about 0.3 parts by weight carbon black and/or silica, preferably carbon black.

It is important to appreciate that the zinc stearate, metallic salt, preferably contributes a substantially white color to the coating composition. Accordingly, a resin for the binder is utilized so that the metallic salt, e.g. zinc stearate, is a primary colorant, yielding a composition that is substantially white in color, unless a dye or other colorant is added. Thus, if the resin is not entirely clear and has a residual color (many hydrocarbon-derived resins have, for example, a light brown, light yellow or straw color), it preferably is of a very light color so that the coating composition is of a light color, preferably white, that contrasts with black. The flattening agent is used in such a small amount that the coating is still typically a white or a slightly off-white.

While it is appreciated that a dye, or other colorant, might be desired to be utilized in the marking composition by a user, this description is directed to describing the marking composition without such colorant, although it is intended that this invention includes such marking composition, whether or not a colorant is added to create a color differing from white or off-white.

In further practice of this invention, an uncured rubber composition is provided having said coating on at least one of its surfaces.

In a preferred aspect of this invention, the said rubber composition is a curable rubber composition which contains carbon black and, thus, is black in color. As a result the aforesaid coating composition readily contrasts with the black colored rubber so that the coating readily marks and, thus, identifies the coated rubber substrate.

It is an important feature of this invention that the metallic salt, e.g. zinc stearate, has a maximum melting point of about 135° C. and a resin binder therefor is used having the melting point of 80° C. to 120° C. so that the blend thereof will soften and melt at rubber cure temperatures in a range of about 135° C. to about 150° C.

It is to be appreciated by those having skill in such art that, on a commercial, rubber manufacturing basis, zinc stearate, which is a common ingredient in rubber compositions, contains some impurities. Thus, while the meting point of zinc stearate in pure form is indicated to have a melting point of about 130° C.; *The Condensed Chemical Dictionary*, 9th Edition, page 941 (1977); it may more commonly have a melting point closer to 120° C. According to the *Merck Index*, 10th Edition, page 9962, (1983), zinc stearate usually occurs as a mixture of zinc salts of stearic and palmitic acids, usually with some excess of zinc oxide and prepared from stearic acid and zinc chloride. Its indicated uses include as a drying lubricant and dusting powder for rubber.

In the description of this invention, the term "zinc stearate" is intended to mean zinc stearate in its impure form in which its major component is zinc stearate, with a more minor amount of zinc palmitate.

In the practice of this invention, it is considered that the resin binder for the metallic salt, e.g. zinc stearate, plays an important part for providing a continuous coating as compared to a more granular, discontinuous coating consisting only of metallic salt particles. It is also intended to reduce or eliminate a cracked appearance of the coating on the rubber surface.

In further accordance with this invention, a method of marking an uncured rubber article and, thus, identifying such rubber article, comprises coating at least one surface of an uncured rubber article with a coating composition, having a color contrasting to the color of said rubber, and drying said coated surface; wherein said coating composition comprises (A) 100 parts by weight fine particle sized metallic salt of a fatty acid having a melting point of less than 135° C., preferably a zinc salt and more preferably zinc stearate and, (B) as a binder therefor, about 10 to about 15 parts by weight of said resin, and (C) about 150 to about 300 parts by weight organic solvent, wherein said solvent has a KB value in the range of about 30 to about 38, preferably about 32 to about 36, has an aromatic hydrocarbon content of less than about one weight percent.

Preferably, the rubber contains carbon black and is black in color due to the carbon black, although the rubber substrate may of some other color so long as it contrasts with the marking coating composition.

Preferably, the solvent is comprised of a mixture which comprises (i) about 15 to about 25 parts by weight of n-heptane, and (ii) about 50 to about 70 parts by weight of at least one of methylcyclohexane and cis 1,2- methylcyclopentane.

In further accordance with this invention, a method of manufacturing a rubber article comprises the steps of (A) providing a marked colored rubber composition, preferably black, and a curative therefor and having an identifying contrasting colored marking thereon, preferably a white color, as the coating composition of this invention, (B) assembling at least one of said marked rubber composition components together to form an article of one or more rubber components, and (C) curing said article under conditions of an elevated pressure and a temperature of at least about 135° C., preferably at least about 140° C. depending somewhat upon the tire type, size and rubber composition, wherein said contrasting white color of the marking composition visibly disappears.

By referring to the said contrastingly colored coating, or marking as disappearing, it is meant that it tends to loose its contrasting color and, thus, becomes invisible on such basis.

Apparently, the coating looses its contrasting color visibility because both the metallic salt, e.g. zinc stearate, and its resin binder are melted at the rubber cure temperature, although the zinc stearate will tend to absorb into the rubber at a somewhat lower temperature and, because of their typical compatibility with conventional rubber compositions, autogeneously absorb or imbibe into the rubber composition itself, although the mechanism of its disappearance may not be completely understood.

The preferred solvent for the coating composition can contain up to about 35, preferably up to about 20, percent by weight, based on the total solvent, of at least one other liquid $C_7$ and $C_8$ saturated alkyl (branched) aliphatic and/or alicyclic hydrocarbon. This refers to hydrocarbons which contain 7 or 8 carbon atoms, respectively. Such other saturated hydrocarbons can include, for example, 4-methylheptane, 3,4-dimethyl-hexane, 3-ethylhexane, 1,1-dimethylcyclohexane, t-1-methyl-3-ethylcyclopentane, t-1-methyl-2-ethylcyclo-pentane, 1-methyl-1-ethylcyclopentane, cis-1-methyl-2-ethylcyclopentane, 2,4-dimethylheptane and cis 1,2-dimethylcyclohexane, so long as the KB value requirement is met.

In one aspect, it is considered that component (B) of said solvent can be methylcyclohexane or cis 1,2-methylcyclopentane.

In practice, the said coating mixture, in addition to the metallic salt, e.g. zinc stearate, resin binder and solvent, also usually desirably contains suspending agent(s), dispersing agent(s) and flattening agent(s) therefor.

A primary purpose of the binder is to cause the coating to be continuous, as previously discussed.

Sometimes, the zinc stearate, for example, contains minute impurities which cause the coating to retain some degree of visibility, even a small amount of contrasting color. Also, the melted resin, although somewhat absorbed into the rubber composition, may exhibit a degree of glossy appearance.

It is the purpose of the flattening agent, the very small amount of carbon black, that helps to substantially mask, on a black rubber surface (due to the carbon black in the rubber) the residual zinc stearate impurities and also fattens a glossy appearance of the melted residual resin on the cured rubber surface.

Representative examples of binder resins are, for example, non-reactive alkyl phenol formaldehyde resins; polyterpene resins: hydrocarbon derived resins; and esterified rosin acids. Such resins are, generally, well known to those having skill in such art. Many are classified as tackifier resins. Representative of a non-reactive alkyl phenol formaldehyde resin is, for example, the reaction product of octylphenol and formaldehyde.

A primary purpose of the suspending agent(s) is to suspend the particulate inorganic filler (zinc stearate) in the liquid medium.

Representative examples of suspending agents are bentonite clay treated with a quaternary salt and organic based castor wax.

A primary purpose of the dispersing agent is to maintain a stable dispersion of the inorganic particulate filer (zinc stearate).

A primary purpose of a flattening agent(s) is to reduce contrast and reduce reflectance of the light from the coating.

Representative flattening agents are carbon black, such as, for example, high surface area carbon blacks and silica. Carbon black is usually preferred, although silica may be more appropriate when using colored rubber substrates. Thus, for a black colored rubber substrate, it is preferred to use carbon black instead of silica. Carbon blacks typically used in the paint and coating industry are preferred, particularly those having a tint strength of about 100-125 and a surface area of about 200 to about 400.

The metallic salt, e.g. zinc stearate, is used in a particulate form having a size in which essentially all of the particles will pass through a 200 size mesh, although it is preferred that the particles will pass through a 400 size mesh screen. It is referred to herein as a fine particle sized zinc stearate.

The said solvent contains less than one, and preferably less than 0.5, weight percent aromatic hydrocarbons, particularly of any of ethylbenzene, metaxylene, paraxylene, orthoxylene and cumene and of aliphatic and alicyclic hydrocarbons which contain more or less than the said 7–8 carbons, including n-hexane and cyclohexane. This restriction and characterization is intended to indicate and mean that one or more or all of such materials may not be present in the solvent or may be present up to the stated amount.

Thus, in one aspect of the invention, an aliphatic solvent, particularly for preparing the coating is the said hydrocarbon mixture having a KB value in the range of about 30 to about 38, preferably about 32 to about 36 and comprises a blend of (A) about 15 to about 25 parts by weight n-heptane, and (E) about 50 to about 70 parts by weight of at least one of methylcyclohexane and cis 1,2-methylcyclopentane.

As hereinbefore pointed out, such solvent can contain up to about 35, preferably up to about 20 percent by weight, based on the total solvent of said other $C_7$ and $C_8$ saturated alkyl aliphatic and/or alicyclic hydrocarbons.

As previously pointed out, the drying time of the solvent on the rubber surface (e.g. at 24° C.) is important in that it should be long enough for the solvent to have the desired and described effects and, also, to be short enough, on a practical basis, so that it suitably evaporates from the rubber surface treated rubber component(s) so that they can be assembled in a relatively short time. In the practice of this invention, boiling point parameters (at normal atmospheric pressure) for such purpose have been found to be (i) an initial boiling point range of about 95° C. to about 102° C. and, (ii) a final dry point (flash distilling the solvent to a dry point) of about 102° C. to about 116° C.

Upon curing of the rubber substrate at elevated temperature (at east 135° C.), the coating has been observed to visually disappear, as previously pointed out.

An important feature of the dried coating, prior to curing the rubber substrate, is that it is, basically, a continuous film made possible by the resin binder for the metal salt, e.g. zinc stearate.

The disappearance of the coating is due to the low melting points of the metal salt, e.g. zinc stearate, and resin binder and, also, the solubility of the resin in the rubber and the compatibility of the metal salt with the rubber, although the entire mechanism may not be completely understood.

As is as well known to those having skill in the rubber art, sulfur curable rubber blends, e.g. rubber used for the said rubber substrate, are blends of rubbers which contain carbon-to-carbon double bonds which sulfur acts upon to create the cured rubber products. Usually such high unsaturation diene derived rubbers (carbon to carbon bond unsaturation) are selected from diene unit containing rubbers which may include, although not limited thereto, cis 1,4-polybutadiene, trans 1,4-polybutadiene, cis 1,4-polyisoprene, trans 1,4-polyisoprene, medium vinyl polybutadiene, styrene/butadiene copolymer rubbers, as well as chloroprene rubber. Low unsaturation rubbers may be selected, for example, from butyl and halobutyl rubbers and from EPDM rubbers.

The butyl rubbers are typically in the form of a copolymer of isobutylene with a minor amount of isoprene and it is further considered that such butyl rubbers may be halobutyl rubbers such as, in particular, chlorobutyl and bromobutyl rubbers.

The method of this invention can be used to aid in the assembly of rubber components for various articles including tires and industrial products, including belts and hoses.

It is to be appreciated that the uncured or partially cured rubber substrate is typically a blend of the aforesaid rubber in combination with various compounding ingredients therefor which includes, for example; carbon black, zinc oxide, zinc stearate or stearic acid, antidegradants such as antioxidants and antiozonants, waxes-particularly microcrystalline waxes, silica and possibly couplers for the silica, resins, sulfur and cure accelerator(s).

In the description of this invention, the terms "uncured" and "partially cured" rubber are used. The terms are intended to relate to compounded rubber which is rubber mixed with appropriate compounding ingredients, including curatives. The term "partially cured" usually means rubber which is less than about 80% cured. In the practice of this invention, it is intended that the solvent and/or solvent-based composition be used to coat uncured and/or partially cured compounded rubber compositions. Thus, the term "uncured", as used in this description, is intended to include both uncured and partially cured rubber.

The practice of this invention is more illustrated shown in the following examples in which the parts and the percentages are by weight unless otherwise indicated, although the invention is not to be limited to the Examples.

EXAMPLE 1

A coating composition was prepared of the following recipe shown in Table 1.

TABLE 1

| Material | Parts |
| --- | --- |
| Zinc stearate | 100 |
| Phenol formaldehyde resin[1] | 12.5 |
| Clay suspending agent and thickener[2] | 1.0 |
| Carbon black flattening agent[3] | 0.05–0.3 |
| Solvent[4] | 19.5 |
| Dispersing and wetting agent[5] | 0.5 to 1 |

[1]Alkyl phenol formaldehyde resin (non-reactive) obtainable as SP1068 from Schenectady Chemical, Inc.
[2]Obtainable as Bentonite SD (bentonite clay treated with a quaternary salt) and Thixatrol ST (an organic based castor wax) from Rheox, Inc.
[3]Carbon black obtainable as Monarch 1300 or Monarch 1100 (Name) from Cabot Corporation was added as desired after mixing the other materials.
[4]A solvent mixture composed of:

| Material | Parts |
| --- | --- |
| N-heptane | 20 |
| Methylcyclohexane and/or cis 1,2-dimethylcyclopentane | 57 |
| Other hydrocarbons[4.4] | 23 |

[4.4]Comprised of 1,1,3-trimethylcyclopentane (3.7%), ethylcyclopentane and/or 2,5-dimethylhexane (3.9%) and t-1,2-cis 4-trimethylcyclopentane (2.6%) as dominate constituents.
[5]A sodium salt of a maleate/acrylate copolymer obtainable as Nuosperse 657 from Huels America, Inc.

EXAMPLE II

An uncured rubber sample is prepared having a dimension of about 2.5 cm by about 15.2 cm and a thickness of about 0.16 cm.

The uncured rubber sample is identified as Exp. A and is comprised of ingredients shown in Table 2.

TABLE 2

| Material | Parts Exp A |
| --- | --- |
| Natural Rubber or Polyisoprene | 50 |
| SBR Rubber | 50 |
| Carbon Black | 50 |
| Process Oil | 10 |

Conventional amounts of zinc oxide, stearic acid, antidegradant(s) accelerator(s) and sulfur are used.

EXAMPLE III

The uncured rubber sample Exp. A identified in Table 2 herein is treated by coating one surface thereof with a coating of Example I at a temperature of about 24° C. followed by allowing the coating to dry for about 1-2 minutes at about 24° C. to form a thin film of less than one mil thickness. The drying time for the solvent on the rubber surface is considered to be adequate.

The coated rubber surface has an appearance which can be described as an off-white color, non-glossy and a continuous film.

The coated rubber is cured at about 150° C. for about one half hour.

The contrastingly coated surface of the rubber is not now visibly apparent. The colored coating has apparently disappeared. The coated surface now has a black, slightly glossy, appearance. The visual disappearance of the coating is apparently due to the melting and absorbing of the zinc stearate and resin, although the entire mechanism of the disappearance of the composition may not be completely understood.

In the description of this invention, the preferred marking composition has sometimes been referred to as being white, although, in practice, the color may be what could be described as an off-white, or an almost white or a dirty white. For the description of the invention as contained herein, the term "white" is intended to mean any and all of such color variations.

While certain representative embodiments and details have been shown for the purpose of illustrating the invention, it will be apparent to those skilled in this art that various changes and modifications may be made therein without departing from the spirit or scope of the invention.

What is claimed is:

1. A substantially white composition is provided which is comprised of (A) 100 parts by weight of fine particle sized zinc stearate, a melting point of less than 135° C., and (B) as a binder therefor, about 10 to about 15 parts by weight of a non-reactive alkyl phenol formaldehyde resin characterized by having a melting point in a range of about 80° C. to about 120° C., (ASTM E28), and soluble in an organic solvent having a KB in a range of about 28 to about 38, and (C) about 0.05 to about 0.3 parts by weight carbon black and/or silica.

2. A method of marking an uncured rubber article which comprises coating at least one surface of an uncured rubber article with a coating composition and drying said coated surface; wherein said coating composition is substantially white and comprises (A) 100 parts by weight Zinc stearate, (B) as a binder therefor, about 10 to about 15 parts by weight of a non-reactive alkyl phenol formaldehyde resin characterized by having a melting point in a range of about 80° C. to about 120° C. and soluble in an organic solvent having a KB value in a range of about 28 to about 38, about 0.05 to about 0.3 parts by weight carbon black and/or silica, and (D) about 150 to about 300 parts by weight organic solvent, wherein said solvent has a KB value in the range of about 30 to about 38, and has an aromatic hydrocarbon content of less than about one weight percent.

3. The method of claim 2 where said solvent is a mixture which comprises (i) about 15 to about 25 parts by weight of n-heptane, and (ii) about 50 to about 70 parts by weight of at least one of methylcyclohexane and cis 1,2-methylcyclopentane.

4. An uncured rubber composition having a coating composition on at least one of its surfaces applied according to the method of claim 2.

5. An uncured rubber composition having a coating composition on at least one of its surfaces applied according to the method of claim 3.

6. A method of manufacturing rubber article comprises the steps of (A) providing a marked rubber composition containing a curative therefor and having an identifying substantially white colored marking coating composition thereof, (B) assembling at least one of said marked rubber composition components together to form an article of one or more rubber components, and (C) curing said article under conditions of an elevated pressure and a temperature of at least about 135° C.; wherein said substantially white color of the marking composition visibly disappears; wherein said marking composition is comprised of (A) 100 parts by weight of zinc stearate, (B) as a binder therefor, about 10 to about 15 parts by weight of a non-reactive alkyl phenol formaldehyde resin characterized by having a melting point in range of about 90° C. to about 110° C. and soluble in an organic solvent having a KB in a range of about 28 to about 38, (C) about 0.05 to about 0.3 parts by weight carbon black and/or silica.

7. A rubber article prepared according to the method of claim 6.

* * * * *